J. H. BARR.
Plowshare.
No. 211,689. Patented Jan. 28, 1879.
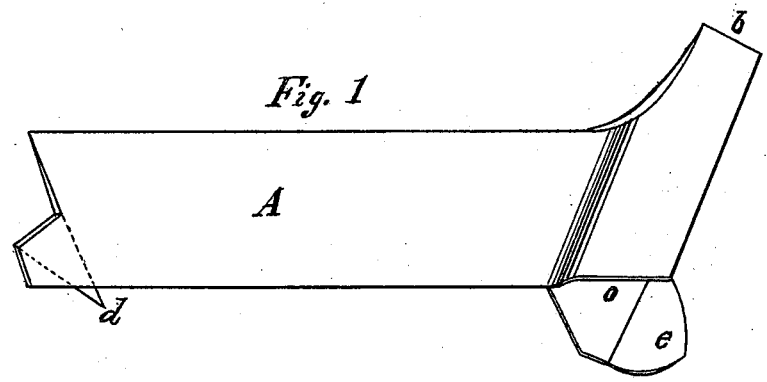
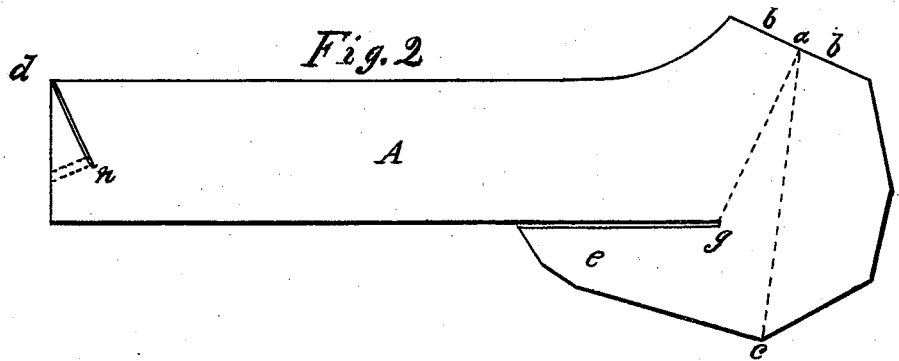
Witnesses: Ferris Ogden, Scott Wherry
Inventor, Jacob H. Barr

UNITED STATES PATENT OFFICE.

JACOB H. BARR, OF MANSFIELD, OHIO.

IMPROVEMENT IN PLOWSHARES.

Specification forming part of Letters Patent No. 211,689, dated January 28, 1879; application filed December 6, 1878.

*To all whom it may concern:*

Be it known that I, JACOB H. BARR, of Mansfield, in the county of Richland and State of Ohio, have invented a new and useful Improvement in Plowshares, which improvement is fully set forth in the following specification, reference being had to the accompanying drawings.

The object of my invention is to rapidly form from one plate of steel an adjustable combined plow-point, $b$, share A, cutter $e$, and socket $o$, as shown in the perspective view, Figure 1, of the accompanying drawings. The socket $o$ is made tapering toward and ends at a wedge-shaped block of steel, that is welded in the point $b$. The socket is open on the side under the share, and adjusts itself to any point that is admitted. The hook $d$ is formed from the same plate of steel, and is to receive the old share or mold-board.

Fig. 2 represents the plate of steel from which my share is made.

By bending at $a\ g$ and $a\ c$, the parts $b\ b$ are brought together, and the cutter $e$ is raised to its place, and the socket $o$ is formed. I weld between the parts $b\ b$ a wedge-shaped piece of steel. The point $d$ is turned under and back at $n$, as shown at $d$, Fig. 1.

I am aware that it is not new to form removable plow points or shares from sheet metal cut and bent to fit on or over the point or share of a plow, and I do not claim such, broadly, as my invention; but What I do claim, and desire to secure by Letters Patent, is—

A plowshare made of the plate A, slitted at $g$ and $n$, and bent on the lines $a\ c$ and $a\ g$ around a wedge-shaped block, to form a plow-point with a socket, a fin-shaped cutter, and a share with a hook at its rear end, substantially as shown and described.

JACOB H. BARR.

Witnesses:
F. WHITNEY,
E. R. VINCENT.